(12) United States Patent
Huang

(10) Patent No.: US 9,847,693 B2
(45) Date of Patent: Dec. 19, 2017

(54) MOTOR BRAKE DEVICE

(71) Applicant: DELTA ELECTRONICS, INC., Taoyuan Hsien (TW)

(72) Inventor: Min-Ling Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 398 days.

(21) Appl. No.: 14/657,764

(22) Filed: Mar. 13, 2015

(65) Prior Publication Data
US 2016/0181890 A1  Jun. 23, 2016

(30) Foreign Application Priority Data

Dec. 19, 2014 (TW) .............................. 103144442 A

(51) Int. Cl.
| | | |
|---|---|---|
| H02K 7/10 | (2006.01) | |
| H02K 7/102 | (2006.01) | |
| H02K 49/06 | (2006.01) | |
| F16D 65/00 | (2006.01) | |

(52) U.S. Cl.
CPC ....... H02K 7/1025 (2013.01); F16D 65/0006 (2013.01); H02K 49/06 (2013.01)

(58) Field of Classification Search
CPC .... H02K 49/043; H02K 49/06; H02K 7/1025; H02K 7/1021; H02K 7/1023; F16D 65/0006
USPC .......................................................... 310/77
See application file for complete search history.

(56) References Cited

U.S. PATENT DOCUMENTS

| | | | | |
|---|---|---|---|---|
| 5,447,280 A | * | 9/1995 | Feathers ............ | A62B 35/0093 182/237 |
| 5,711,404 A | * | 1/1998 | Lee .................... | A63B 21/0051 188/158 |
| 5,722,612 A | * | 3/1998 | Feathers ............ | A62B 35/0093 192/103 C |
| 5,898,249 A | * | 4/1999 | Boggs, III .............. | F16D 27/09 192/84.1 |
| 5,909,073 A | * | 6/1999 | Lamb ................... | H02K 49/046 310/103 |
| 6,182,803 B1 | * | 2/2001 | Hirai ....................... | F16D 55/02 188/161 |

(Continued)

FOREIGN PATENT DOCUMENTS

| | | |
|---|---|---|
| CN | 2484297 | 4/2002 |
| CN | 2729420 | 9/2005 |
| CN | 202931106 | 5/2013 |

*Primary Examiner* — Terrance Kenerly
(74) *Attorney, Agent, or Firm* — Kirton McConkie; Evan R. Witt

(57) ABSTRACT

A motor brake device includes an armature base, an armature plate, a fixing plate and at least one brake lining. The armature plate is disposed on the armature base. The armature plate is vertically movable relative to the armature base. The fixing plate is fixed on the armature base. The fixing plate and the armature base are located at two opposite sides of the armature plate. The braking assembly is arranged between the armature plate and the fixing plate, and includes a two-winged rotor hub plate, a brake friction plate and at least two elastic elements. The at least one brake lining is arranged between the armature plate and the braking assembly and/or between the fixing plate and the braking assembly.

11 Claims, 9 Drawing Sheets

(56) References Cited

U.S. PATENT DOCUMENTS 7,281,620 B2* 10/2007 Wolner .................... A62B 1/10
                                                        192/223.1
2004/0222235 A1* 11/2004 Hayduk ................ B29B 7/7663
                                                          222/1

* cited by examiner

MOTOR BRAKE DEVICE

FIELD OF THE INVENTION

The present invention relates to a brake device, and more particularly to a motor brake device.

BACKGROUND OF THE INVENTION

Generally, a motor brake device is installed on a motor for decelerating, stopping or accurately positioning the motor. The conventional motor brake device comprises a brake lining, a rotor hub, a fixing plate, an armature plate and an armature base. The armature plate is located near the armature base. The brake lining is arranged between the fixing plate and the armature plate. The rotor hub is disposed within a corresponding slot of a brake friction plate. Moreover, the rotor hub matches the shaft of the motor. Consequently, the rotations of the rotor hub and the brake friction plate may be driven by the motor.

When the motor is normally operated and an electric current flows through the motor brake device, the armature plate is magnetically attracted by the armature base, so that the armature plate is moved away from the brake lining. At the same time, the rotations of the rotor hub and the brake friction plate are driven by the shaft of the motor. On the other hand, when the electric current is interrupted, the armature plate is no longer magnetically attracted by the armature base. Consequently, the compressed springs within the armature base are restored to their original positions, and the armature plate is moved toward the brake lining. Under this circumstance, the brake lining is in contact with the armature plate and the fixing plate. In response to the friction force between the brake lining and the armature plate, the braking efficacy of the motor is achieved.

Although the conventional motor brake device is able to achieve the function of decelerating or stopping the motor, there are still some drawbacks. For example, if there is a large production tolerance between the rotor hub and the brake friction plate of the motor brake device or if there is a seam between the rotor hub and the brake friction plate after a long use time, the operation of the motor brake device may generate vibration and noise or result in radial deflection between the rotor hub and the brake friction plate. Under this circumstance, the transmission precision of the motor brake device is impaired, and the performance of the motor brake device is adversely affected.

Therefore, there is a need of providing an improved motor brake device so as to overcome the above drawbacks.

SUMMARY OF THE INVENTION

An object of the present invention provides a motor brake device with a zero-backlash mechanism of a braking assembly, so that the noise and the vibration of the motor are reduced.

Another object of the present invention provides a motor brake device using a two-winged rotor hub plate to increase the torque force and provide the better braking efficacy.

A further object of the present invention provides a motor brake device with two brake linings attached on the two opposite surfaces of the braking assembly, so that the double surface braking efficacy of the braking assembly is achieved and the braking performance is increased.

In accordance with an aspect of the present invention, there is provided a motor brake device. The motor brake device includes an armature base, an armature plate, a fixing plate and at least one brake lining. The armature plate is disposed on the armature base. When the armature plate is driven by the armature base, the armature plate is vertically moved relative to the armature base. The fixing plate is locked on the armature base. The fixing plate and the armature base are located at two opposite sides of the armature plate. The braking assembly is arranged between the armature plate and the fixing plate, and includes a two-winged rotor hub plate, a brake friction plate and at least two elastic elements. The at least one brake lining is arranged between the armature plate and the braking assembly and/or between the fixing plate and the braking assembly.

In accordance with another aspect of the present invention, there is provided a braking assembly for a motor brake device. The motor brake device includes an armature base, an armature plate, a fixing plate and at least one brake lining. The armature plate is driven by the armature base to be vertically movable relative to the armature base. The fixing plate is locked on the armature base. The fixing plate and the armature base are located at two opposite sides of the armature plate. The braking assembly is arranged between the armature plate and the fixing plate. The at least one brake lining is arranged between the armature plate and the braking assembly and/or between the fixing plate and the braking assembly. The braking assembly includes a two-winged rotor hub plate, a brake friction plate and at least two elastic elements. The brake friction plate has a two-winged slot corresponding to the two-winged rotor hub plate. The two-winged rotor hub plate is accommodated within the two-winged slot. Each of the elastic elements is arranged between the two-winged rotor hub plate and the brake friction plate and provides an elastic force to the two-winged rotor hub plate.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
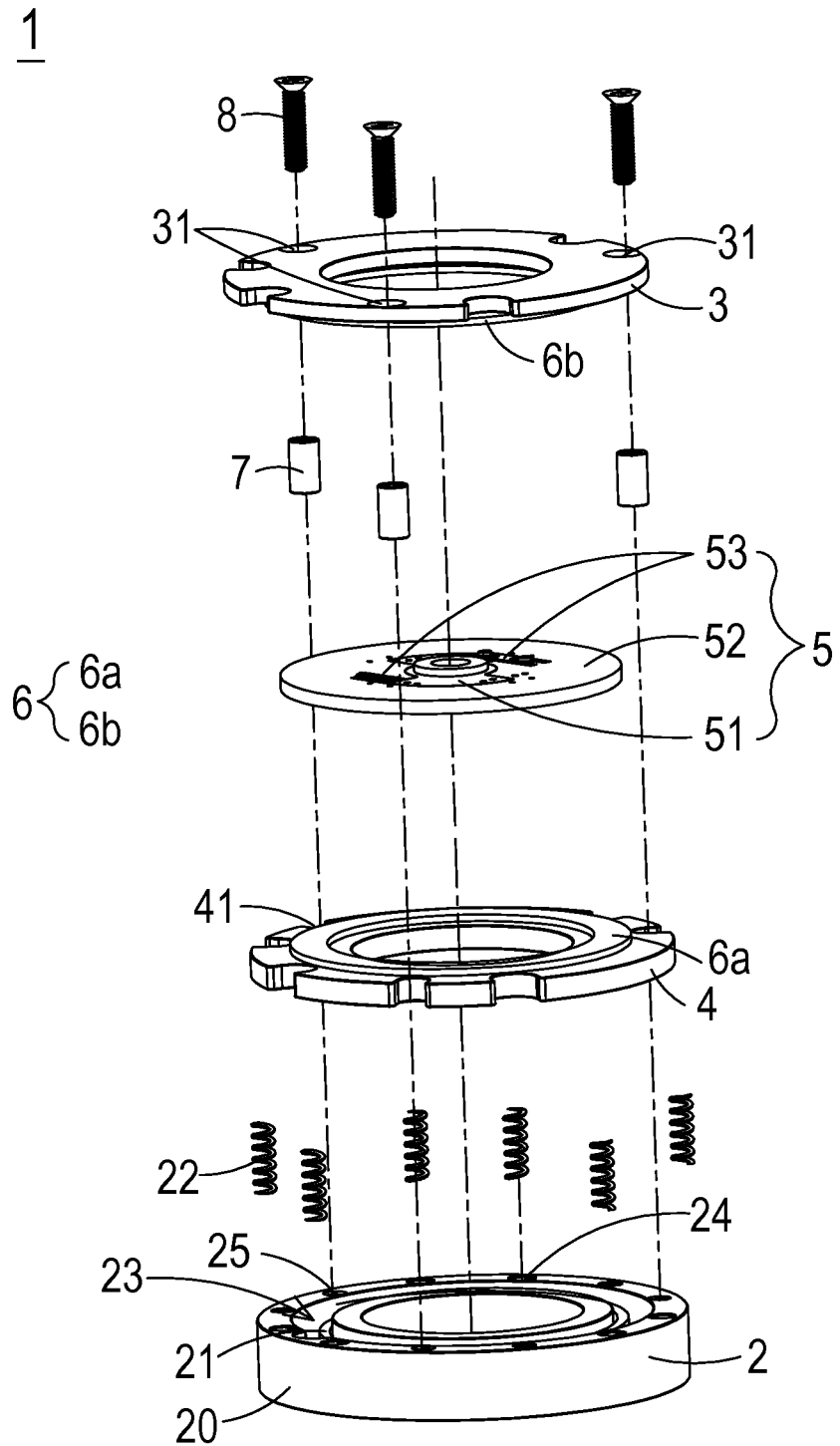
FIG. 1A is a schematic exploded view illustrating a motor brake device according to an embodiment of the present invention.

FIG. 1A is a schematic exploded view illustrating a motor brake device according to an embodiment of the present invention. As shown in FIG. 1A, the motor brake device 1 comprises an armature base 2, a fixing plate 3, a armature plate 4, a braking assembly 5 and at least one brake lining 6. The armature plate 4 is made of a metallic material and disposed on the armature base 2. Moreover, when the armature plate 4 is driven by the armature base 2, the armature plate 4 is vertically movable relative to the armature 2 base. The fixing plate 3 is locked on the armature 2. In addition, the fixing plate 3 and the armature 2 are located at two opposite sides of the armature plate 4. The braking assembly 5 is arranged between the armature plate 4 and the fixing plate 3. The braking assembly 5 comprises a two-winged rotor hub plate 51, a brake friction plate 52 and at least two elastic elements 53. The brake friction plate 52 has a two-winged slot 521 (see FIG. 3) corresponding to the two-winged rotor hub plate 51. The two-winged rotor hub plate 51 is accommodated within the two-winged slot 521 and tightly fixed on a shaft of a motor (not shown). Preferably, the two-winged rotor hub plate 51 and the two-winged slot 521 are a butterfly-shaped sleeve and a butterfly-shaped slot, respectively. The two elastic elements 53 are in contact with the two-winged rotor hub plate 51 and the brake friction plate 52. Moreover, the two elastic elements 53 provide elastic forces to the two-winged rotor hub plate 51. The at least one brake lining 6 is arranged between the armature plate 4 and the braking assembly 5 and/or between the fixing plate 3 and the braking assembly 5. While the motor brake device 1 performs a braking operation, the braking assembly 5 and the at least one brake lining 6 are clamped by the fixing plate 3 and the armature plate 4. Consequently, the rotation of the braking assembly 5 is stopped, and the braking operation is completed.

Figure 2:
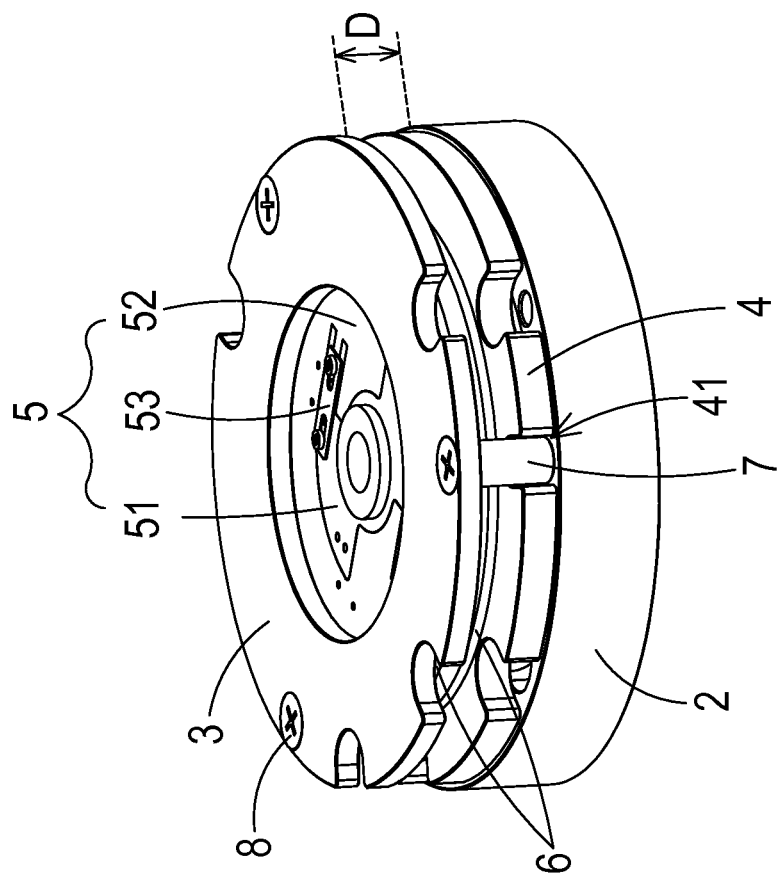
FIG. 2 is a schematic assembled view illustrating the motor brake device of FIG. 1A.

FIG. 2 is a schematic assembled view illustrating the motor brake device of FIG. 1A. As shown in FIGS. 1A and 2, the armature base 2 comprises a main part 20, an electromagnetic coil 21 and plural elastic elements 22. The main part 20 comprises an accommodation space 23, plural accommodation holes 24 and plural fixing holes 25. The electromagnetic coil 21 is accommodated within the accommodation space 23. The plural elastic elements 22 are accommodated within the plural accommodation holes 24, respectively. Moreover, first ends of the plural elastic elements 22 are in contact with the armature plate 4. In this embodiment, the elastic elements 22 are springs, but are not limited thereto. When an electric current flows through the electromagnetic coil 21, the armature base 2 may generate a magnetically attractive force. In response to the magnetically attractive force, the armature plate 4 is moved toward the armature base 2 and the plural elastic elements 22 are compressed by the armature plate 4. When the electric current is interrupted, the armature base 2 no longer generates the magnetically attractive force. Consequently, the compressed elastic elements 22 are restored to their original positions, and the armature plate 4 is moved away from the armature base 2. Under this circumstance, the braking assembly 5 and the at least one brake lining 6 are clamped by the fixing plate 3 and the armature plate 4 collaboratively, so that the braking operation is performed.

The fixing plate 3 and the armature base 2 are located at two opposite sides of the armature plate 4. Moreover, the fixing plate 3 is locked on the armature base 2. In particular, the motor brake device 1 further comprises plural fixing spacers 7 corresponding to plural notches 41 of the armature plate 4. The plural fixing spacers 7 are received within the corresponding notches 41. Moreover, the top edge surface and the bottom edge surface of each fixing spacer 7 are in contact with the fixing plate 3 and the armature base 2, respectively. In this embodiment, the plural fixing spacers 7 have the same height. Consequently, the fixing plate 3 and the armature base 2 are separated from each other by a fixed distance D (see FIG. 2). The fixing plate 3 has plural perforations 31 corresponding to the fixing holes 25 of the armature base 2. The motor brake device 1 further comprises plural screwing elements 8. After the screwing elements 8 are sequentially penetrated through the corresponding perforations 31 of the fixing plate 3, the corresponding fixing spacers 7 and the corresponding fixing holes 25 of the armature base 2, the fixing plate 3 is locked on the armature base 2. As long as the fixing plate 3 can be securely fixed on the armature base 2, the mechanism of fixing the fixing plate 3 on the armature base 2 is not restricted.

Figure 3:
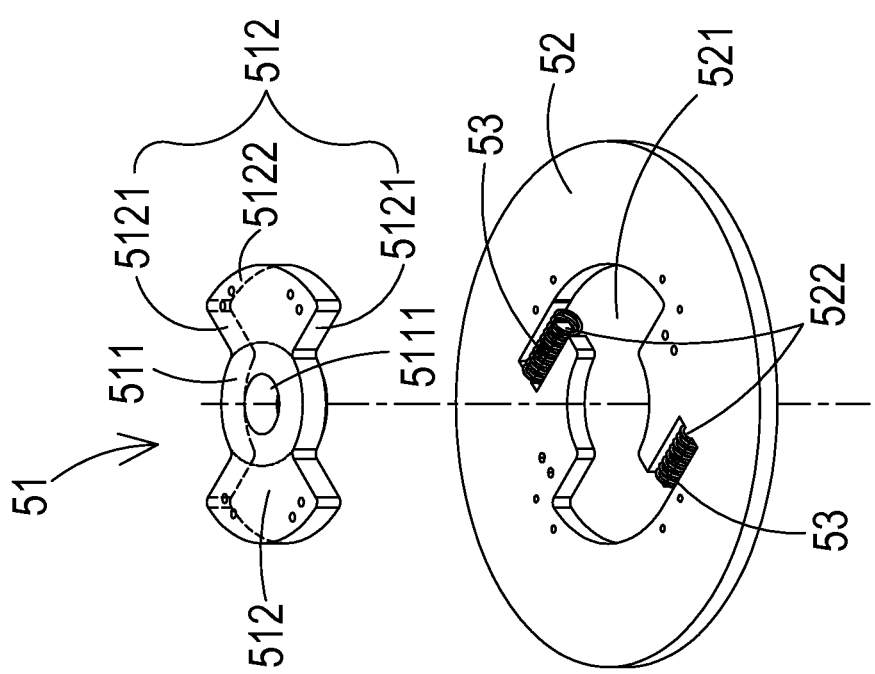
FIG. 3 is a schematic assembled view illustrating the braking assembly of the motor brake device of FIG. 1A.

FIG. 3 is a schematic assembled view illustrating the braking assembly of the motor brake device of FIG. 1A. The braking assembly 5 is arranged between the armature plate 4 and the fixing plate 3. The braking assembly 5 comprises the two-winged rotor hub plate 51, the brake friction plate 52 and at least two elastic elements 53. Preferably, the braking assembly 5 comprises two elastic elements 53. The two-winged rotor hub plate 51 comprises a connecting part 511 and two wing structures 512. The connecting part 511 has a circular cross section, but is not limited thereto. Moreover, the connecting part 511 has an axial hole 5111 for allowing the shaft of the motor to go through. The shaft of the motor is penetrated through the axial hole 5111 of the connecting part 511, so that the two-winged rotor hub plate 51 is fixed on the shaft. Consequently, while the motor is operated, the two-winged rotor hub plate 51 is driven by the shaft of the motor and correspondingly rotated. As the two-winged rotor hub plate 51 is rotated, the braking assembly 5 is correspondingly rotated. In this embodiment, the two wing structures 512 of the two-winged rotor hub plate 51 are located at two opposite sides of the connecting part 511. The wing structure 512 is tapered from an outer periphery of the wing structure 512 to the connecting part 511. In other words, the wing structure 512 is a fan-shaped structure. The lateral periphery of each wing structure 512 comprises two flat surfaces 5121 and a cambered surface 5122. The cambered surface 5122 is arranged between the two flat surfaces 5121. The two ends of the flat surface 5121 are connected with the connecting part 511 and the cambered surface 5122, respectively. Due to the connecting part 511 and the two wing structures 512, the two-winged rotor hub plate 51 has a butterfly-shaped profile so as to withstand a larger torsion force.

In this embodiment, the brake friction plate 52 is used for accommodating the two-winged rotor hub plate 51. The brake friction plate 52 has the two-winged slot 521 corresponding to the two-winged rotor hub plate 51. The braking assembly 5 further comprises two elastic elements 53. When the two-winged rotor hub plate 51 is accommodated within the two-winged slot 521 of the brake friction plate 52, the two elastic elements 53 are arranged at the junctions between the two-winged rotor hub plate 51 and the brake friction plate 52 and symmetrical with respect to the center of the two-winged rotor hub plate 51 (for example the axial hole 5111). After the two elastic elements 53, the two-winged rotor hub plate 51 and the brake friction plate 52 are combined together, the braking assembly 5 is formed as an elastic structure to absorb the backlash between the two-winged rotor hub plate 51 and the brake friction plate 52. Consequently, during operation of the motor brake device 1, the noise, vibration and radial deflection between the two-winged rotor hub plate 51 and the brake friction plate 52 will be minimized. Under this circumstance, the transmission performance of the motor and the braking efficacy of the motor brake device are both enhanced.

Figure 4:
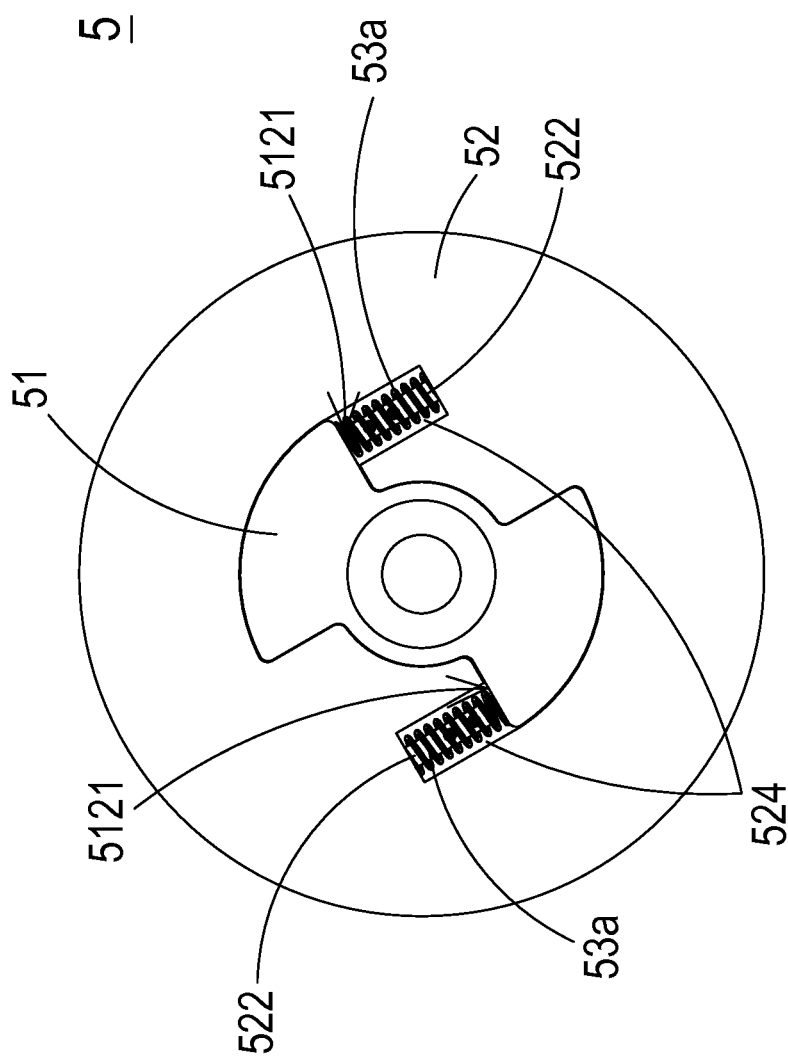
FIG. 4 is a schematic top view illustrating the braking assembly of FIG. 3.

FIG. 4 is a schematic top view illustrating the braking assembly of FIG. 3. Examples of the elastic elements 53 include but are not limited to springs 53*a*. The brake friction plate 52 further comprises two receiving recesses 524 and two extension posts 522 corresponding to the two springs 53*a*. The extension posts 522 are disposed within the corresponding receiving recesses 524. Moreover, the extension posts 522 are extended toward the corresponding flat surfaces 5121 of the wing structures 512 of the two-winged rotor hub plate 51. The springs 53*a* are sheathed around the corresponding extension posts 522. Consequently, the springs 53*a* are not deviated or detached.

In this embodiment, the springs 53*a* are symmetrical with respect to the center of the two-winged rotor hub plate 51. Moreover, the springs 53*a* are in contact with the corresponding wing structures 512 of the two-winged rotor hub plate 51. Preferably, the springs 53*a* are compression springs for providing a pair of lateral shearing forces in two opposite directions. The lateral shearing forces are applied to corresponding flat surfaces 5121 of the wing structures 512. That is, the lateral shearing forces may be transmitted from the brake friction plate 52 to the corresponding flat surfaces 5121 of the wing structures 512 of the two-winged rotor hub plate 51 through the extension posts 522 and the two springs 53*a*. Consequently, the seam between the two-winged rotor hub plate 51 and the brake friction plate 52 is eliminated. In other words, the braking assembly 5 is a zero-backlash mechanism. It is noted that the number of the springs 53*a* is not restricted. For example, in another embodiment, the braking assembly 5 comprises four springs 53*a*. The four springs 53*a* are arranged at four junctions between the two-winged rotor hub plate 51 and the brake friction plate 52 for providing two pairs of lateral shearing forces in two opposite directions. The two pairs of lateral shearing forces are applied to the corresponding flat surfaces 5121 of the wing structures 512.

Figure 5:
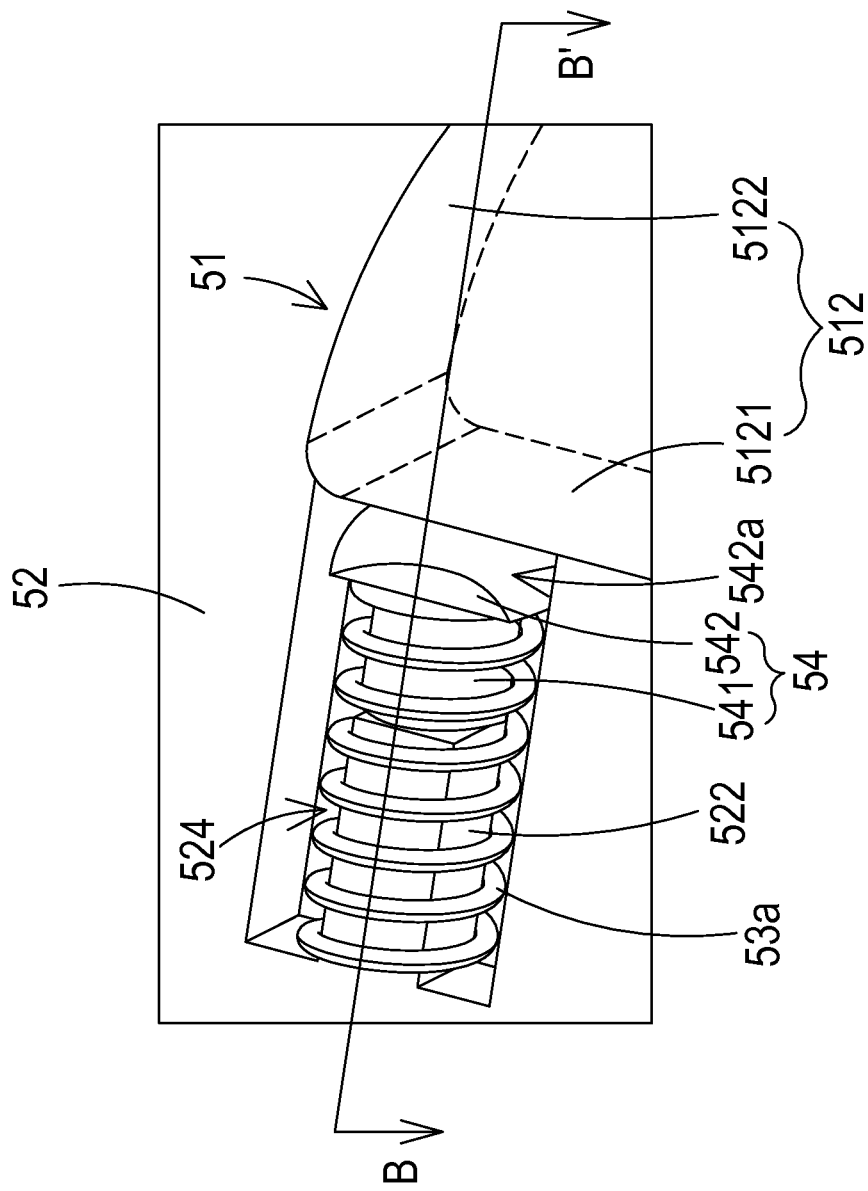
FIG. 5 is a schematic partial view illustrating a variant example of the braking assembly used in the motor brake device of the present invention.
Figure 6:
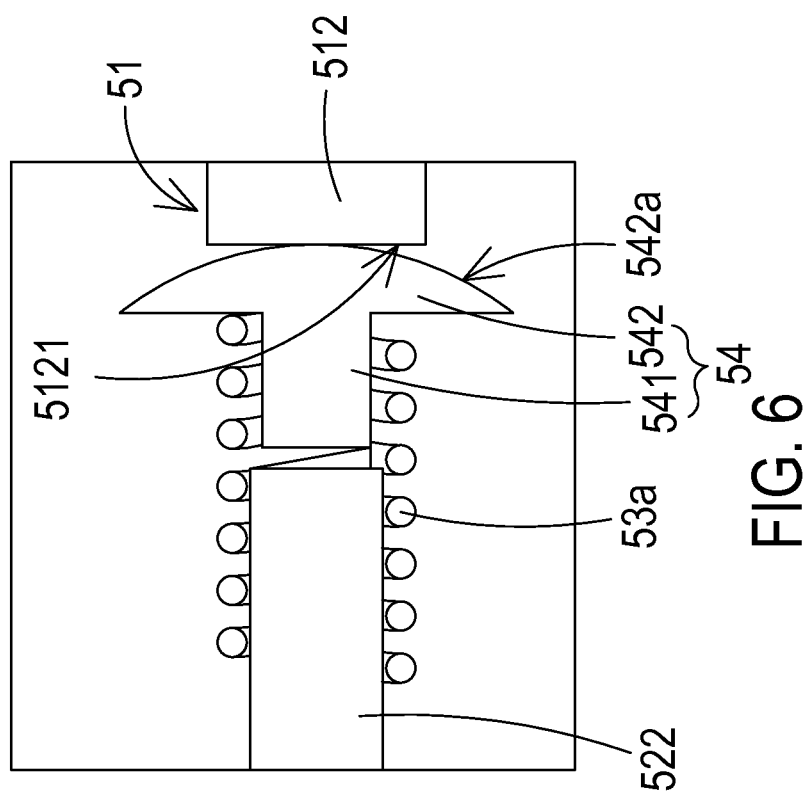
FIG. 6 is a schematic cross-sectional view illustrating the braking assembly of FIG. 5 and taken along the line BB'.

It is noted that numerous modifications and alterations may be made while retaining the teachings of the invention. FIG. 5 is a schematic partial view illustrating a variant example of the braking assembly used in the motor brake device of the present invention. FIG. 6 is a schematic cross-sectional view illustrating the braking assembly of FIG. 5 and taken along the line BB'. For improving the friction force between the spring 53*a* and the corresponding flat surfaces 5121 of the wing structures 512 of the two-winged rotor hub plate 51, the braking assembly 5 further comprises two spacers 54. The spacers 54 are disposed within the corresponding receiving recesses 524. Each of the spacers 54 comprises a protrusion part 541 and a capping part 542. The spring 53*a* is sheathed around the corresponding protrusion part 541 of the spacer 54 and the corresponding extension post 522. In other words, the extension post 522 and the spacer 54 are linked with each other through the corresponding spring 53*a*. The capping part 542 has a cambered surface 542*a*, which is in contact with the corresponding flat surface 5121 of the wing structure 512 of the two-winged rotor hub plate 51. Since the contact area between the spacer 54 and the corresponding flat surface 5121 of the wing structure 512 of the two-winged rotor hub plate 51 is reduced, the friction between the spacer 54 and the corresponding flat surface 5121 of the wing structure 512 of the two-winged rotor hub plate 51 is reduced and the axial movement between the spacer 54 and the corresponding flat surface 5121 of the wing structure 512 of the two-winged rotor hub plate 51 is smoother.

Figure 7:
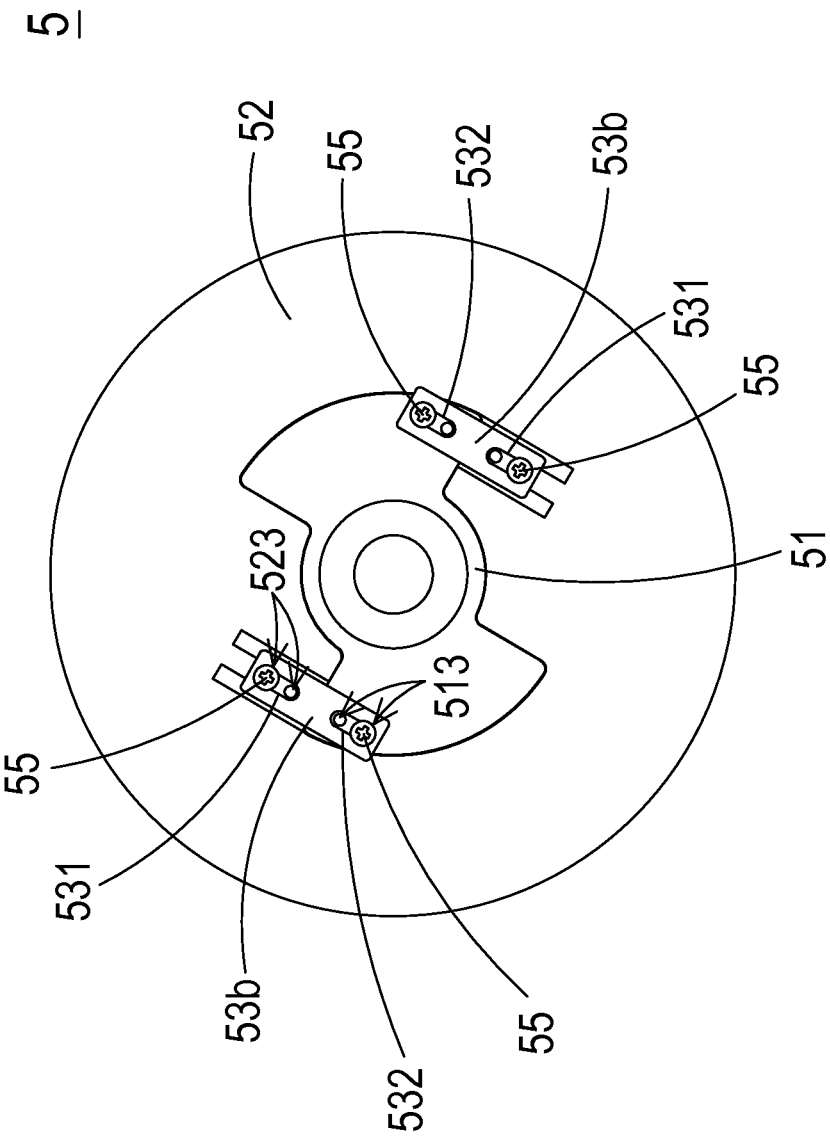
FIG. 7 is a schematic top view illustrating another variant example of the braking assembly used in the motor brake device of the present invention.

FIG. 7 is a schematic top view illustrating another variant example of the braking assembly used in the motor brake device of the present invention. It is noted that the elastic elements 53 are not restricted to the springs 53*a*. As shown in FIG. 7, the elastic elements 53 are resilience sheets 53*b*. The two resilience sheets 53*b* are symmetrical with respect to the center of the two-winged rotor hub plate 51. The two ends of each resilience sheet 53*b* are fixed on the brake friction plate 52 and the two-winged rotor hub plate 51, respectively. The two resilience sheets 53*b* provide a pair of lateral shearing forces in two opposite directions. The lateral shearing forces are applied to corresponding flat surfaces 5121 of the wing structures 512. Consequently, the seam between the two-winged rotor hub plate 51 and the brake friction plate 52 is eliminated. In other words, the braking assembly 5 is a zero-backlash mechanism. Moreover, plural screwing holes 523 are formed in the brake friction plate 52, and plural screwing holes 513 are formed in the two-winged rotor hub plate 51. Moreover, a first opening 531 and a second opening 532 are formed in two ends of the resilience sheet 53*b*, respectively. After a screwing element 55 is penetrated through the first opening 531 and tightened into the screwing hole 523 of the brake friction plate 52 and another screwing element 55 is penetrated through the second opening 532 and tightened into the screwing hole 513 of the two-winged rotor hub plate 51, the resilience sheet 53*b* is fixed on the brake friction plate 52 and the two-winged rotor hub plate 51. It is noted that the way of fixing the resilience sheet 53*b* is not restricted. For example, the resilience sheet 53*b* may be fixed on the brake friction plate 52 and the two-winged rotor hub plate 51 through rivets. Moreover, the resilience sheet 53*b* may be made of mild steel or any other appropriate material. The material of the resilience sheet 53*b* is not restricted as long as the resilience sheets 53*b*, the two-winged rotor hub plate 51 and the brake friction plate 52 are combined as an elastic structure. It is noted that the number of the resilience sheets 53*b* is not restricted. For example, in another embodiment, the braking assembly 5 comprises four resilience sheets 53*b*. The four resilience sheets 53*b* are arranged at four junctions between the two-winged rotor hub plate 51 and the brake friction plate 52.

Figure 8:
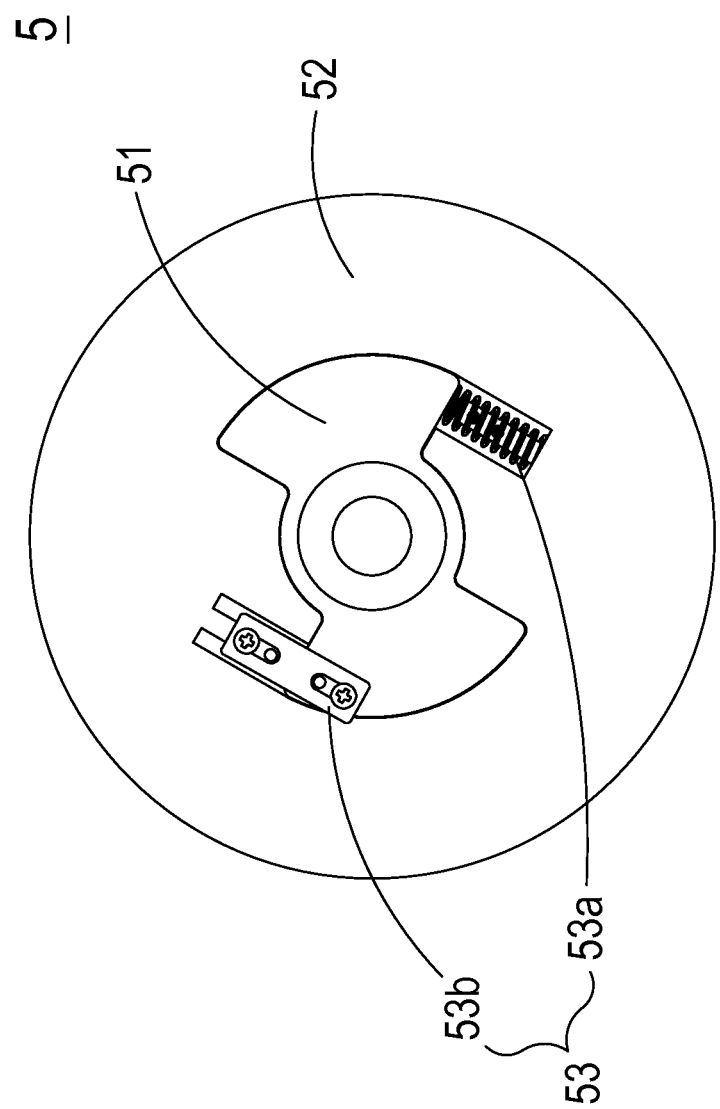
FIG. 8 is a schematic top view illustrating another variant example of the braking assembly used in the motor brake device of the present invention.

FIG. 8 is a schematic top view illustrating another variant example of the braking assembly used in the motor brake device of the present invention. In this embodiment, one of the two elastic elements 53 is a spring 53*a*, and the other elastic element 53 is a resilience sheet 53*b*. The ways of fixing the spring 53*a* and the resilience sheet 53*b* and the operating principles of the spring 53*a* and the resilience sheet 53*b* are similar to those of the above embodiment, and are not redundantly described herein.

Please refer to FIG. 1A again. As mentioned above, the at least one brake lining 6 is arranged between the armature plate 4 and the braking assembly 5 and/or between the fixing plate 3 and the braking assembly 5. In this embodiment, the at least one brake lining 6 comprises a first brake lining 6*a* and a second brake lining 6*b*. The first brake lining 6*a* is arranged between the armature plate 4 and the braking assembly 5. The second brake lining 6*b* is arranged between the fixing plate 3 and the braking assembly 5. In other words, the first brake lining 6a and the second brake lining 6b are located at two opposite sides of the braking assembly 5, and the first brake lining 6a and the second brake lining 6b are attached on the armature plate 4 and the fixing plate 3, respectively. While the motor brake device 1 performs the braking operation, the compressed elastic elements 22 are restored to their original positions, and the armature plate 4 is moved away from the armature base 2. Under this circumstance, the braking assembly 5 is clamped by the fixing plate 3 and the armature plate 4 collaboratively, and the first brake lining 6a on the armature plate 4 and the second brake lining 6b on the fixing plate 3 are contacted with the two opposite surfaces of the braking assembly 5. Consequently, the rotation of the braking assembly 5 is decelerated or stopped. By means of the two brake linings 6a and 6b, the double surface braking efficacy of the braking assembly 5 is achieved and the braking performance is increased.

Figure 1B:
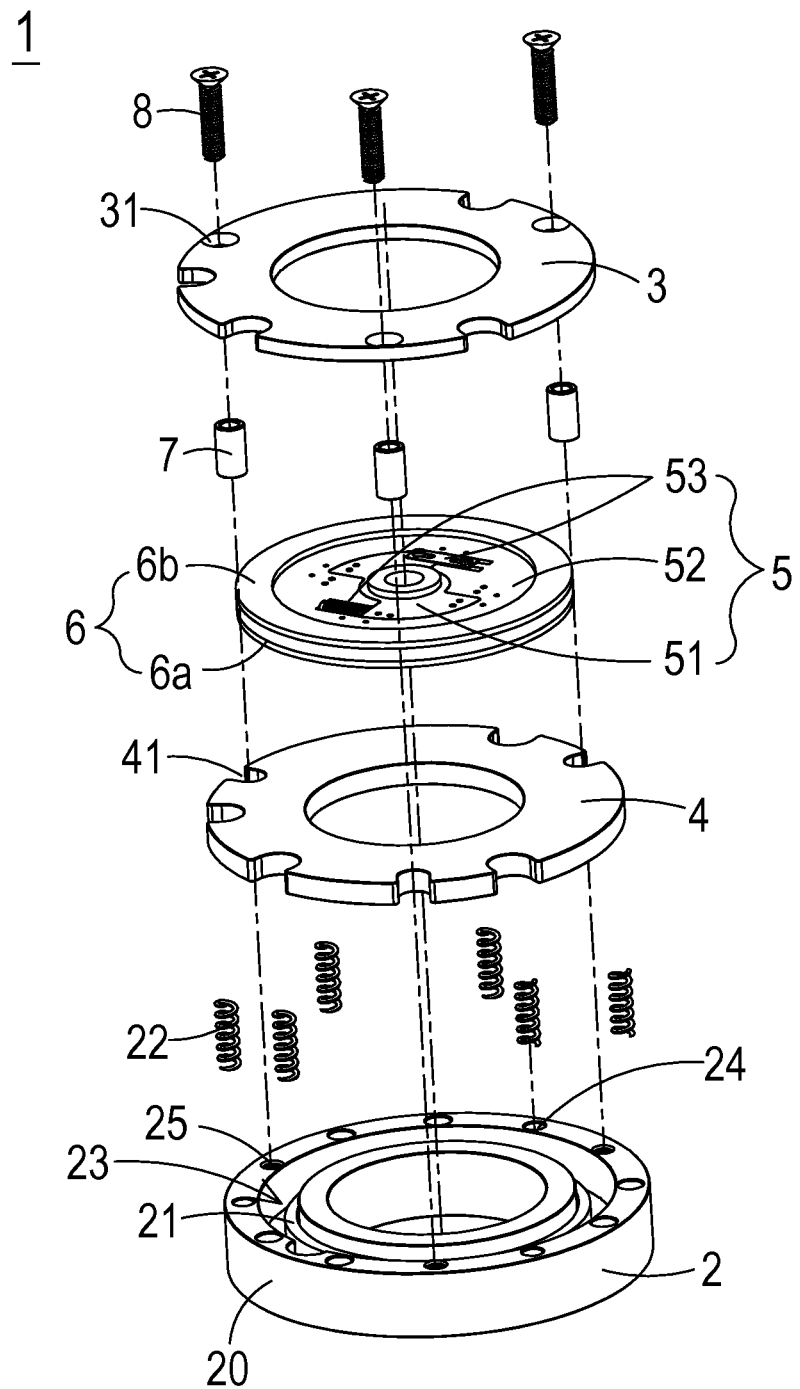
FIG. 1B is a schematic exploded view illustrating a motor brake device according to another embodiment of the present invention.

FIG. 1B is a schematic exploded view illustrating a motor brake device according to another embodiment of the present invention. In comparison with FIG. 1A, the at least one brake lining 6 comprises two brake linings. The two brake linings 6 are attached on two opposite surfaces of the braking assembly 5. When two brake linings 6 are clamped by the fixing plate 3 and the armature plate 4, the double surface braking efficacy of the braking assembly 5 is achieved.

From the above descriptions, the present invention provides the motor brake device. After the elastic elements, the two-winged rotor hub plate and the brake friction plate are combined together, the braking assembly is formed as an elastic structure to absorb the backlash between the two-winged rotor hub plate and the brake friction plate. In other words, the braking assembly is a zero-backlash mechanism. Consequently, during operation of the motor brake device, the noise, vibration and radial deflection between the two-winged rotor hub plate and the brake friction plate will be minimized. Under this circumstance, the transmission performance of the motor and the braking efficacy of the motor brake device are both enhanced. Moreover, since the two brake linings are attached on the two opposite surfaces of the braking assembly or respectively disposed on the fixing plate and the armature plate, the double surface braking efficacy of the braking assembly is achieved and the braking performance is increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motor brake device, comprising:
an armature base;
an armature plate disposed on the armature base, wherein when the armature plate is driven by the armature base, the armature plate is vertically moved relative to the armature base;
a fixing plate fixed on the armature base, wherein the fixing plate and the armature base are located at two opposite sides of the armature plate;
a braking assembly arranged between the armature plate and the fixing plate, and comprising a two-winged rotor hub plate, a brake friction plate and at least two elastic elements; and
at least one brake lining arranged between the armature plate and the braking assembly and/or between the fixing plate and the braking assembly.

2. The motor brake device according to claim 1, wherein the at least one brake lining is attached on the fixing plate and/or the armature plate.

3. The motor brake device according to claim 1, wherein the at least one brake lining is attached on at least one of two opposite surfaces of the braking assembly.

4. The motor brake device according to claim 1, wherein the at least one brake lining comprises a first brake lining and a second brake lining, wherein the first brake lining is arranged between the armature plate and the braking assembly, and the second brake lining is arranged between the fixing plate and the braking assembly.

5. The motor brake device according to claim 1, wherein the brake friction plate has a two-winged slot corresponding to the two-winged rotor hub plate, and the two-winged rotor hub plate is accommodated within the two-winged slot, wherein each of the elastic elements is arranged between the two-winged rotor hub plate and the brake friction plate and provides elastic force to the two-winged rotor hub plate.

6. The motor brake device according to claim 1, wherein the at least two elastic elements are symmetrical to a center of the two-winged rotor hub plate.

7. The motor brake device according to claim 1, wherein the two-winged rotor hub plate comprises a connecting part and two wing structures, wherein the connecting part has an axial hole for allowing a shaft of a motor to go through, so that the two-winged rotor hub plate is fixed on the shaft, wherein the two wing structures are located at two opposite sides of the connecting part, and the two wing structures are fan-shaped structures, wherein a lateral periphery of each wing structure comprises at least one flat surface and a cambered surface.

8. The motor brake device according to claim 7, wherein at least one of the elastic elements is a spring, and the brake friction plate further comprises a receiving recess and an extension post, wherein the extension post is disposed within the receiving recess and extended toward the corresponding flat surface of the two-winged rotor hub plate, and the spring is sheathed around the extension post and in contact with the corresponding flat surface of the two-winged rotor hub plate.

9. The motor brake device according to claim 8, wherein the braking assembly further comprises a spacer, and the spacer is accommodated within the receiving recess, wherein the spacer comprises a protrusion part and a capping part, the spring is sheathed around the protrusion part of the spacer and the extension post, and the capping part is in contact with the corresponding flat surface of the two-winged rotor hub plate.

10. The motor brake device according to claim 1, wherein at least one of the elastic elements is a resilience sheet, wherein two ends of the resilience element are fixed on the brake friction plate and the two-winged rotor hub plate, respectively.

11. A braking assembly for a motor brake device, the motor brake device comprising an armature base, an armature plate, a fixing plate and at least one brake lining, the armature plate being driven by the armature base to be vertically movable relative to the armature base, the fixing plate being fixed on the armature base, the fixing plate and the armature base being located at two opposite sides of the armature plate, the braking assembly being arranged between the armature plate and the fixing plate, the at least one brake lining being arranged between the armature plate and the braking assembly and/or between the fixing plate and the braking assembly, the braking assembly comprising:
- a brake friction plate having a two-winged slot;
- a two-winged rotor hub plate accommodated within the two-winged slot; and
- at least two elastic elements, each of the elastic elements being arranged between the two-winged rotor hub plate and the brake friction plate and providing an elastic force to the two-winged rotor hub plate.

* * * * *